Dec. 15, 1964 P. S. SWARTZ 3,161,809

HIGH FIELD SUPERCONDUCTIVE DEVICE

Filed June 14, 1962

Inventor:
Paul S. Swartz, by Paul R. Webb, II
His Attorney.

United States Patent Office 3,161,809
Patented Dec. 15, 1964

3,161,809
HIGH FIELD SUPERCONDUCTIVE DEVICE

Paul S. Swartz, Schenectady, N.Y., assignor to General Electric Company, a corporation of New York Filed June 14, 1962, Ser. No. 202,516
2 Claims. (Cl. 317—158)

Figure 1:
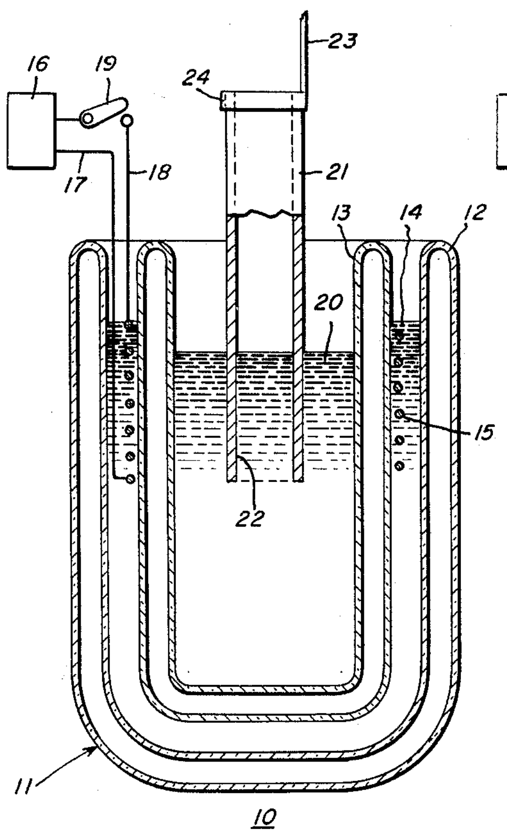

This invention relates to methods of forming high field superconductive devices and more particularly to methods of forming high field superconductive devices with a magnetic field confined within an aperture therein.

As is well known, superconduction is a term describing the type of electrical current conduction existing in certain materials cooled below a critical temperature, $T_c$, where resistance to the flow of current is essentially nonexistent. While the existence of superconductivity in many metals, metal alloys and metal compounds has been known for many years, the phenomenon has been more or less treated as a scientific curiosity until comparatively recent times. The awakened interest in superconductivity may be attributed, at least in part, to technological advances in the arts where their properties would be extremely advantageous in generators, direct current motors and low frequency transformers, and to advances in cyrogenics which removed many of the economic and scientific problems involved in extremely low temperature operations.

My co-pending application entitled "Superconductive Device," which was filed on November 2, 1961, as Serial Number 149,591, and assigned to the same assignee as the present application, discloses and claims high field superconductive devices, apparatus for producing such devices, and methods of producing high magnetic fields.

A high field superconductive body having an aperture therethrough with a magnetic field confined therein will be required with a diameter of several inches and a length of several feet. Such a device might confine a high magnetic field in excess of 20 kilogauss. Large, expensive apparatus and a substantial power supply will be required to produce this device. If a solenoid is employed to produce the device, it will require extensive and expensive quantities of solenoid windings and a substantial power supply for these windings. Thus, it would be desirable to provide more economical methods for forming a high field superconductive device. The present application is directed to such improved methods for forming a high field superconductive device having a substantially greater length than its diameter.

It is an object of my invention to provide a method of forming a high field superconductive device.

It is a further object of my invention to provide a method of forming a high field superconductive device having a substantially greater length than its diameter.

In carrying out my invention in one form, a method of forming a high field superconductive device comprises providing a high field superconductive body having an aperture therethrough producing a constant magnetic field generally parallel to the axis of the body aperture within successive adjacent portions of the aperture, cooling simultaneously associated successive adjacent portions of the body below their critical temperature to provide a normal to superconducting transition within the magnetic field whereby the body becomes superconducting confining the magnetic field within the aperture of the body, and retaining the body below its critical temperature.

Figure 2:
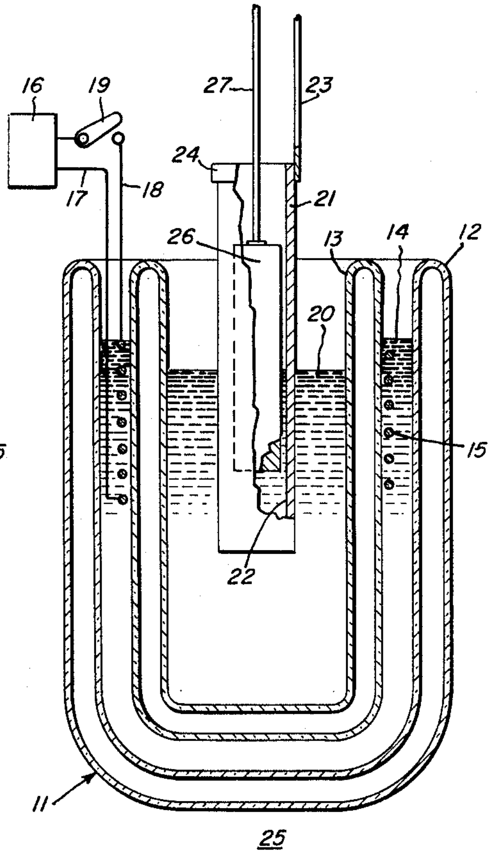

These and various other objects, features, and advantages of the invention will be better understood from the following description taken in connection with the accompanying drawing in which:

FIGURE 1 is a sectional view of apparatus for forming a high field superconductive device in accordance with my invention; and FIGURE 2 is a sectional view of a modified apparatus for forming a high field superconductive device.

In FIGURE 1 of the drawing, apparatus 10 is shown for forming a high field superconductive device. Apparatus 10 comprises an insulated container 11 having an outer insulated vessel 12 and an inner insulated vessel 13 separated by liquid nitrogen 14. A solenoid 15, which is positioned in the upper portion of liquid nitrogen 14, is connected to a power source 16 by means of leads 17 and 18. A switch 19 is provided in lead 18 between solenoid 15 and power source 16 to energize and de-energize the solenoid 15 to provide a constant magnetic field. Liquid helium 20 is contained in inner vessel 13 below the upper edge of solenoid 15 in liquid nitrogen 14. A high field superconductive body 21 containing $Cb_3Sn$ and having a central aperture 22 therethrough is shown partially immersed in liquid helium 20. A rod 23 is attached by means of a band 24 to the upper end of body 21 to manually or automatically move body 21 through liquid helium 20 within solenoid 15. If desired, solenoid 15 can be made of a high field superconductive material and positioned directly in liquid helium 20 to surround member 21.

In FIGURE 2 of the drawing, apparatus 25 is shown for forming a high field superconductive device. This apparatus includes insulated container 11 with its outer insulated vessel 12 and inner insulated vessel 13 separated by liquid nitrogen 14. Solenoid 15, which is positioned in the upper portion of liquid nitrogen 14, is connected to power source 16 by means of leads 17 and 18. Switch 19 energizes and de-energizes solenoid 15 to provide a magnetic field. Liquid helium 20 is contained in inner vessel 13 below the upper edge of solenoid 15 in liquid nitrogen 14. A high field superconductive body 21 containing $Cb_3Sn$ and having a central aperture 22 therethrough is shown partially immersed in liquid helium 20. A rod 23 is attached by means of a band 24 to the upper end of body 21 to manually or automatically move body 21 through liquid helium within solenoid 15. A rod of magnetic material 26, such as iron, is supported within aperture 22 of body 21 by means of a rod 27. Rod 26 is positioned substantially within solenoid 15.

A high field superconductive device is formed by providing a high field superconductive body having an aperture therethrough, producing a constant magnetic field generally parallel to the axis of the body aperture within successive adjacent portions of the aperture, cooling simultaneously associated successive adjacent portions of the body below their critical temperature to provide a normay to superconducting transition within the magnetic field whereby the body becomes superconducting confining the magnetic field within the aperture of the body, and retaining the body below its critical temperature. Such a device is formed without the use of large, expensive apparatus or a substantial power supply.

An insulated container having an outer insulated vessel and an inner insulated vessel separated by liquid nitrogen is provided with a solenoid positioned in the upper part of the liquid nitrogen. The inner vessel is filled with liquid helium to reduce the temperature of the body below its critical temperature. Power is supplied to the solenoid to produce a constant magnetic field. A high field superconducting body, for example, containing $Cb_3Sn$ and having an aperture therethrough is moved manually or automatically into the liquid helium and within the surrounding constant magnetic field produced by this solenoid. As the superconducting body is moved downwardly into the liquid helium and within the magnetic field, a constant magnetic field which is generated parallel to the axis of the body aperture is produced within the successive adjacent portions of the aperture.

The liquid helium cools simultaneously associated successive adjacent portions of the body below their critical temperature to provide a normal to superconducting transition within the magnetic field whereby the body becomes superconducting and confines the magnetic field within its aperture. The power supply is terminated and the body retained in the liquid helium to provide a high field superconductive device. If desired, the body can be removed from the insulated container while it is maintained below its critical temperature and placed in a similar container without an associated power supply. After the body has become superconducting, a magnetic field strength will exist within its aperture which field strength is equal to the strength of the magnetic field at the normal to superconducting transition.

If desired, the superconductive body can remain stationary while a magnetic field and a coolant are moved along the body to produce a magnetic field generally parallel with the axis of the body aperture within successive adjacent portions of the aperture. After the body has become superconducting and confines a magnetic field within its aperture, the body can be retained in a coolant below its critical temperature.

While a solenoid associated with a power source is desirable to produce a magnetic field within the aperture of a superconducting body, my method includes producing a magnetic field within successive adjacent portions of the body aperture by other means. For example, a superconducting solenoid containing $Cb_3Sn$ may be placed directly in the liquid helium in the upper portion of the vessel and connected to a power source.

The magnetic field strength of the superconducting body can be increased above the magnetic field strength produced by the solenoid at the normal to superconducting transition by positioning a magnetic material within the body aperture and within the solenoid. It is preferable to provide the magnetic material with an axial length greater than the normal to superconducting transition length located in the constant magnetic field. The magnetic field strength of the body is equal to the sum of the field strengths produced by the solenoid and the magnetic material. In the above manners, a superconductive body is produced which has a length substantially greater than its diameter without employing an excessively long solenoid with associated substantial power requirements.

In the operation of the apparatus shown in FIGURE 1 of the drawing, switch 19 is closed to activate solenoid 15 from power supply 16 whereby a constant magnetic field is produced. Superconductive body 21 with its aperture 22 is initially at a sufficiently high temperature so that it is not superconducting. Body 21 is moved downwardly by rod 23 into liquid helium 20 surrounded by solenoid 15. As body 21 is moved downwardly in helium 20, a magnetic field generally parallel to the axis of the body aperture is produced within successive adjacent portions of the aperture. The associated successive adjacent portions of body 21 are cooled simultaneously below their critical temperature to provide a normal to superconducting transition within the magnetic field. Body 21 becomes superconducting and confines the magnetic field within the aperture of the body. Subsequently, switch 19 is opened to deactivate solenoid 15 and body 21 is retained within inner vessel 13 to form a superconducting device. If desired, body 21 can be transferred at a temperature below its critical temperature to a similar insulated container to provide a superconducting device.

The operation of apparatus 25 in FIGURE 2 of the drawing is similar to the operation of apparatus 10 in FIGURE 1 of the drawing. However, in FIGURE 2, magnetic material 26 in the form of a rod is supported by a rod 27 within aperture 22 of body 21. Rod 26 is also positioned substantially within solenoid 15. When body 21 is moved downwardly into liquid helium 20, rod 26 remains stationary so that it is within the constant magnetic field produced by solenoid 15. In this manner, aperture 22 of body 21 obtains a magnetic field strength which is equal to the magnetic field strengths produced by solenoid 15 and rod 26, at the normal to superconducting transition. Body 21 becomes superconducting and confines the magnetic field within the aperture of the body. Subsequently, switch 19 is opened to deactivate solenoid 15 and body 21 is retained within inner vessel 13. Rod 26 is removed from aperture 22 of body 21 to form a superconducting device. If desired, body 21 can be transferred at a temperature below its critical temperature to a similar insulated container to provide a superconducting device.

While other modifications of this invention and variations in the method which may be employed within the scope of the invention have not been described, the invention is intended to include such that may be embraced within the following claims.

What I claim as new and desire to secure by Letters Patent of the United States is:

1. An apparatus comprising a high field superconductive body having an aperture therethrough, means to produce a constant magnetic field generally parallel to the axis of said body aperture within successive adjacent portions of said aperture, and means to cool simultaneously associated successive adjacent portions of said body below their critical temperature.

2. An apparatus comprising a high field superconductive body having an aperture therethrough, means to produce a constant magnetic field generally parallel to the axis of said body aperture within successive adjacent portions of said aperture, a magnetic material positioned within said body aperture and substantially within said magnetic field, and means to cool simultaneously associated successive adjacent portions of said body below their critical temperature.

No references cited.

JOHN F. BURNS, *Primary Examiner.*